UNITED STATES PATENT OFFICE.

LOUIS HENNEMEIER, JR., OF JERSEY CITY, NEW JERSEY, ASSIGNOR TO S. ELWOOD MAY, OF NEW YORK, N. Y.

COCOANUT COMPOUND.

SPECIFICATION forming part of Letters Patent No. 391,530, dated October 23, 1888.

Application filed May 26, 1888. Serial No. 275,221. (No specimens.)

*To all whom it may concern:*

Be it known that I, LOUIS HENNEMEIER, Jr., of Jersey City, in the county of Hudson and State of New Jersey, have invented a certain new and useful Improvement in Food Compounds, of which the following is a specification.

The object of my invention is to provide a dry-food compound, which may be cooked by the purchaser, or, if desired, used without cooking.

My invention consists in a food compound in which the ingredients are mixed in a dry and granulated state and in the proportions substantially as follows:

With one and one-third ounce of tapioca I mix one and two-thirds ounce of pulverized sugar, two and one-third ounces of dried cocoanut, and salt enough to cover a cent. The tapioca is granulated to a small size, preferably to about the size of the head of a large pin. The cocoanut is comminuted to a small size. A tea-spoonful of flavoring extract is sprayed upon one of the ingredients, preferably the tapioca, before such ingredient is mixed with the others. This flavored ingredient is dried before mixing with the others.

All the ingredients are mixed together and made into a packet ready for use. The packet may consist of paper impregnated with paraffine and one or more outer wrappers.

All the ingredients are granulated in size so as to readily absorb milk, or milk and beaten eggs, and so that when placed in a hot oven they can be quickly heated.

The compound is ready for use without any additional mixing, save where it is found desirable to introduce the milk and beaten eggs. This compound therefore will save time and expense, besides being so accurately proportioned in respect to its ingredients that it will always be a success. The compound may be used as a pudding or pie filling or for other purposes.

The principle of the improvement may of course be carried out to make other compounds than the one described above.

What I claim is—

The herein-described food compound in dry and granulated form, consisting of tapioca, sugar, cocoanut, salt, and a flavoring extract, the ingredients being in the proportions substantially as set forth.

LOUIS HENNEMEIER, JR.

Witnesses:
   D. H. DRISCOLL,
   M. J. ROACH.